US008855014B2

(12) United States Patent
Previdi et al.

(10) Patent No.: US 8,855,014 B2
(45) Date of Patent: Oct. 7, 2014

(54) DISTRIBUTED STATEFUL PATH COMPUTATION ELEMENT OVERLAY ARCHITECTURE

(75) Inventors: Stefano Previdi, Rome (IT); Jean-Philippe Vasseur, Saint Martin d'Uriage (FR); Jan Medved, Pleasanton, CA (US); David Ward, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 294 days.

(21) Appl. No.: 13/524,071

(22) Filed: Jun. 15, 2012

(65) Prior Publication Data
US 2013/0336159 A1 Dec. 19, 2013

(51) Int. Cl.
*H04L 12/28* (2006.01)
*H04L 1/00* (2006.01)

(52) U.S. Cl.
USPC .......................................... 370/254; 370/236

(58) Field of Classification Search
None
See application file for complete search history.

(56) References Cited

U.S. PATENT DOCUMENTS

| | | | |
|---|---|---|---|
| 7,031,262 | B2 | 4/2006 | Vasseur et al. |
| 7,551,569 | B2 | 6/2009 | Vasseur |
| 7,558,214 | B2 | 7/2009 | Previdi et al. |
| 7,660,254 | B2 | 2/2010 | Vasseur et al. |
| 7,668,971 | B2 | 2/2010 | Vasseur et al. |
| 7,684,351 | B2 | 3/2010 | Vasseur et al. |
| 7,801,137 | B2 | 9/2010 | Vasseur et al. |
| 7,986,618 | B2 | 7/2011 | Charny et al. |
| 7,995,500 | B2 | 8/2011 | Vasseur |
| 8,199,642 | B2 | 6/2012 | Vasseur et al. |
| 8,363,571 | B2 | 1/2013 | Vasseur et al. |
| 8,369,213 | B2 | 2/2013 | Vasseur et al. |
| 2009/0180489 | A1 | 7/2009 | Fujita et al. |

FOREIGN PATENT DOCUMENTS

WO  WO-2011049491 A1   4/2011

OTHER PUBLICATIONS

Cipolla, et al., "Notification of Transmittal of the International Search Report and the Written Opinion of the International Searching Authority, or the Declaration", Patent Cooperation Treaty, International Application No. PCT/US2013/045971, mailed Oct. 11, 2013, 7 pages, European Patent Office, Rijswijk, Netherlands.
"Distributed Hadh Table", Wikipedia Foundation Inc., http://en.wikipedia.org/wiki/Distributed_hash_table, May 26, 2012, 7 pages.
Crabbe, et al., "PCEP Extensions for Stateful PCE", IETF Trust, Network Working Group, Internet Draft, draft-ietf-pce-stateful-pce-00, Feb. 2012, 52 pages.

(Continued)

*Primary Examiner* — Eunsook Choi
(74) *Attorney, Agent, or Firm* — Edwards Wildman Palmer LLP; James M. Behmke; Stephen D. LeBarron

(57) ABSTRACT

In one embodiment, a particular device in a computer network maintains a locally owned tunnel-state table, and joins a distributed hash table (DHT) ring. In addition, the locally owned tunnel-state table is shared with other devices of the DHT ring to establish a DHT-owned tunnel-state table. The particular device (and other devices) determines ownership of link-state advertisements (LSAs) for a specific portion of a traffic engineering database (TED) according to the DHT ring. As such, when the particular device (or any device) computes a path for a tunnel using a local TED, the particular device may request permission to use resources along the computed path that were advertised in particular LSAs from owners of those particular LSAs when not owned by the particular device.

20 Claims, 13 Drawing Sheets

(56) References Cited

OTHER PUBLICATIONS

Farrel, et al., "A Path Computation Element (PCE)-Based Architecture", The Internet Society, Network Working Group, Request for Comments 4655, Aug. 2006, 41 pages.

Pan, et al., "Fast Reroute Extensions to RSVP-TE for LSP Tunnels", The Internet Society, Network Working Group, Request for Comments 4090, May 2005, 39 pages.

Vasseur, et al., "Path Computation Element (PCE) Communication Protocol (PCEP)", IETF Trust, Network Working Group, Request for Comments 5440, Mar. 2009, 87 pages.

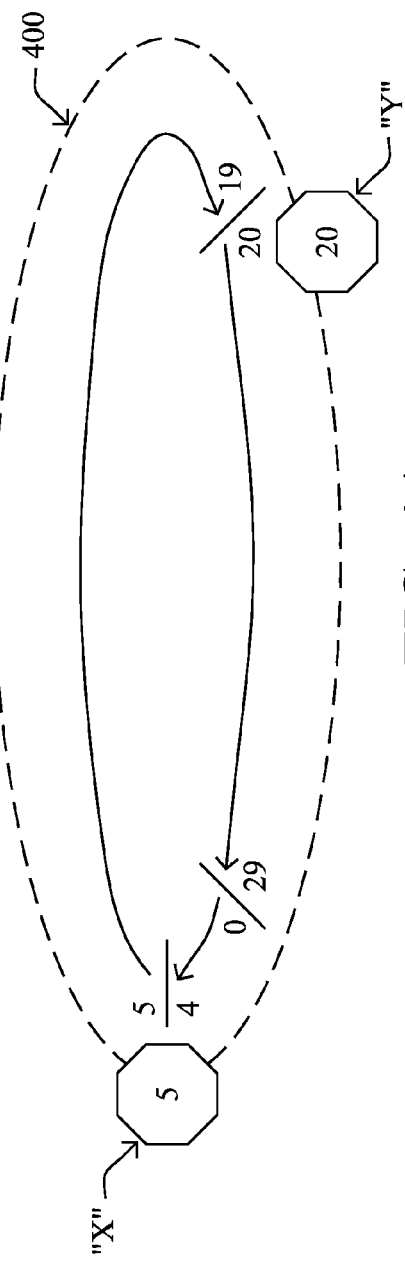
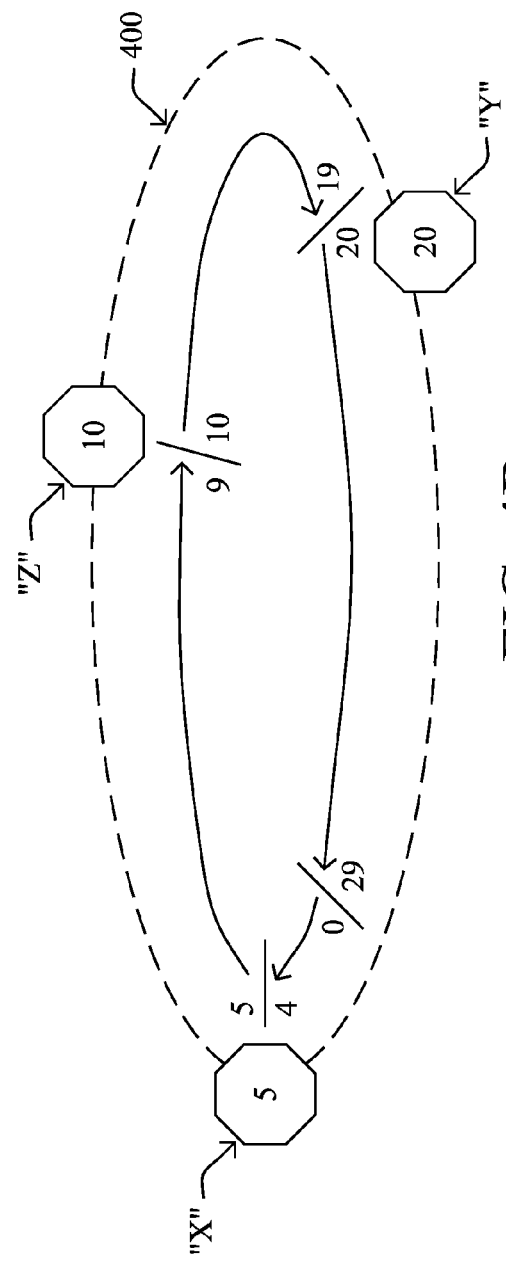
FIG. 4A
FIG. 4B

|  LSAs 510  |  OWNERS 520  |
| :---: | :---: |
| LSA 1 | A |
| LSA 2 | A |
| LSA 3 | B |
| ⋮ | ⋮ |
| LSA N | C |

TED 500

FIG. 5

DISTRIBUTED STATEFUL PATH COMPUTATION ELEMENT OVERLAY ARCHITECTURE

TECHNICAL FIELD

The present disclosure relates generally to computer networks, and, more particularly, to path computation elements (PCEs).

BACKGROUND

Tunnels have been used for a number of applications such as the support of virtual private networks (VPNs) or Traffic Engineering following source routed paths hop-by-hop. Among the number of tunneling techniques developed over the past decade, multiprotocol label switching (MPLS) Traffic Engineering (TE) has been widely deployed by service providers and large enterprise networks in order to optimize the network resource in light of specified traffic demand (traffic engineering) or in support of fast restoration of traffic in case of link and/or node failures thanks to local protection techniques as MPLS TE Fast Reroute that rely on local reroute upon fast detection of a network element failure.

Path computation elements (PCEs), as defined, for example, in the Internet Engineering Task Force's Request for Comment (RFC) 4655, generally consist of relying on an external engine (PCE) responsible for the computation of tunnels in the network. Head-ends (or Path Computation Clients—PCCs) send requests to PCEs (PCReq messages) using the PCEP signaling protocol (RFC 5440), and receive computed paths thanks to replies (PCRep messages). PCEP also specifies notification and error messages. PCEs have been used mostly for back-up tunnel path computation and inter-domain (Inter-area/AS) path computations where per-domain path computation was the only (potentially very sub-optimal) technique available prior to the PCE.

PCE-based networks deployed so far have been stateless. That is, tunnels were computed by the PCE according to the Traffic Engineering Database (TED) fed in most cases by the routing protocol without requiring any state maintenance. However, for certain applications, stateful PCE may provide a more optimal solution. A new stateful PCE draft has been adopted as an IETF Working Document, entitled "PCEP Extensions for Stateful PCE" <draft-ietf-pce-stateful-pce> by Crabbe et al., and which specifies several new PCEP messages, allowing PCCs to update the PCE on their tunnel states (PCRpt messages), control tunnel delegation (ability for the PCE to remotely control a tunnel) and for the PCE to send tunnel requests to PCCs to learn states (PCUpd messages). Stateful PCE architectures, however, still present a number of challenges of various natures.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 4A-4B illustrate examples of a distributed hash table (DHT) ring;
FIG. 5 illustrates an example of traffic engineering database (TED) ownership.

DESCRIPTION OF EXAMPLE EMBODIMENTS

Overview

According to one or more embodiments of the disclosure, a particular device in a computer network maintains a locally owned tunnel-state table, and joins a distributed hash table (DHT) ring. In addition, the locally owned tunnel-state table is shared with other devices of the DHT ring to establish a DHT-owned tunnel-state table. The particular device (and other devices) determines ownership of link-state advertisements (LSAs) for a specific portion of a traffic engineering database (TED) according to the DHT ring. As such, when the particular device (or any device) computes a path for a tunnel using a local TED, the particular device may request permission to use resources along the computed path that were advertised in particular LSAs from owners of those particular LSAs when not owned by the particular device.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain" and a router used to interconnect multiple domains is generally referred to as a "border router" or BR. In the case of areas rather than ASes since the routers are under a common authority, a single router may in fact serve as an exit border router of one area and an entry border router of another area.

Figure 1A:
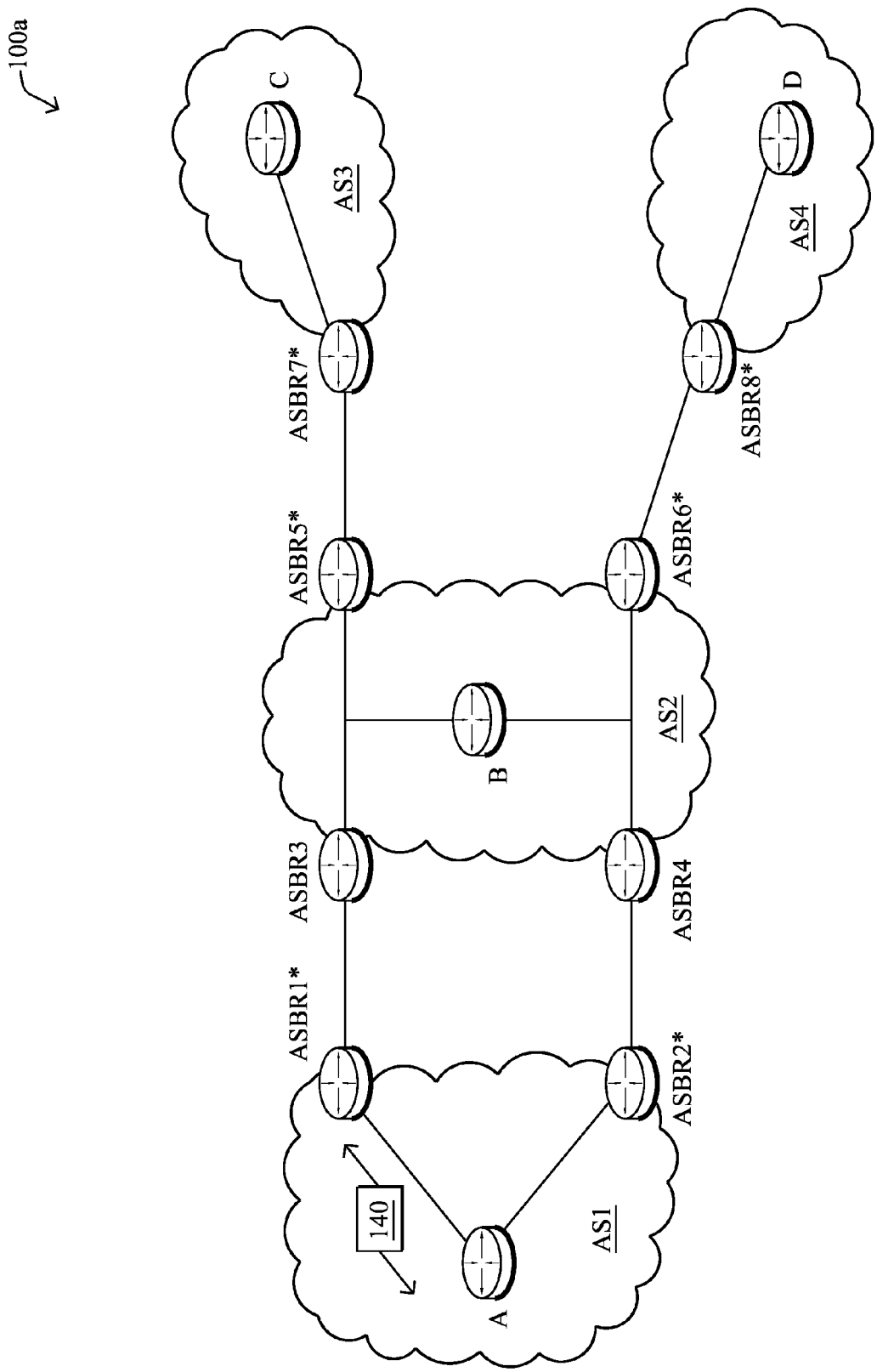
FIGS. 1A-1B illustrate example computer networks.

FIG. 1A is a schematic block diagram of an exemplary computer network 100a comprising autonomous system AS2, which is interconnected with a plurality of other autonomous systems AS1, AS3, and AS4. An Autonomous System (AS) is herein defined to be a group of intermediate nodes, such as intradomain routers, within a network that are subject to a common authority and execute one or more intradomain routing protocols. Although, each AS is illustratively an autonomous system, those skilled in the art will appreciate that the ASes may alternatively be configured as routing domains or other networks or subnetworks. The autonomous system AS1 includes intradomain routers such as border routers ASBR1* and ASBR2* through which communication, such as data packets, may pass into and out of the autonomous system to border routers ASBR3 and ASBR4, respectively of AS2. AS2 also includes border routers ASBR5* and ASBR6* in communication with border routers ASBR7* and ASBR8* of ASes 3 and 4, respectively. Moreover, within AS1, AS2, AS3, and AS4, there are exemplary intradomain routers A, B, C, and D, respectively.

Figure 1B:
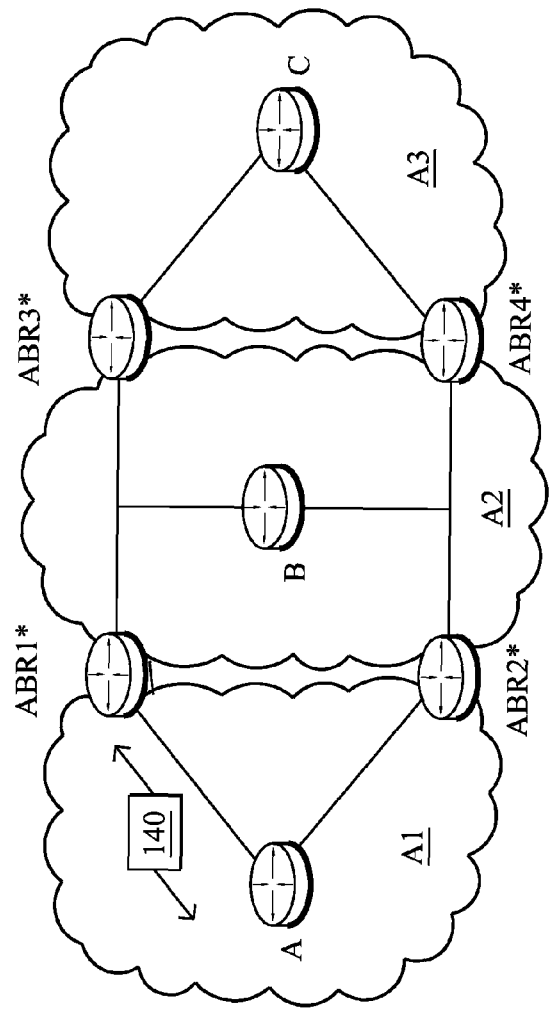

Alternatively or in addition, FIG. 1B is a schematic block diagram of an exemplary computer network 100b comprising areas A1, A2, and A3, each having at least one intradomain router, A, B, and C, respectively. In particular, A1 and A2 share border routers ABR1* and ABR2*, while A2 and A3 share ABR3* and ABR4. As used herein, an area is a collection of routers that share full network topology information with each other but not necessarily with routers outside the area. The term area as used herein also encompasses the term "level" which has a similar meaning for networks based on their chosen routing protocol.

Data packets 140 (e.g., discrete frames or packets of data) may be exchanged among the nodes/devices of the computer network 100 (100a and 100b, generically) using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc. In this context, a protocol consists of a set of rules defining how the nodes interact with each other. For example, in addition to user data, routing information may be distributed among the routers within an AS (e.g., between areas A1-A3) using pre-determined "interior" gateway protocols (IGPs), such as conventional distance-vector protocols or, illustratively, link-state protocols, through the use of link-state advertisements (LSAs) or link-state packets. Moreover, data packets containing network routing information may be exchanged among the autonomous systems AS1-AS4 using "external" gateway protocols, such as the Border Gateway Protocol (BGP).

Those skilled in the art will understand that any number of nodes, devices, links, etc. may be used in the computer network, and that the view shown herein is for simplicity. Furthermore, the techniques described below with reference to inter-AS path computation may be used in the context of inter-area path computation and, under certain conditions, the techniques described with reference to inter-area path computation may be used for inter-AS path computation.

Figure 2:
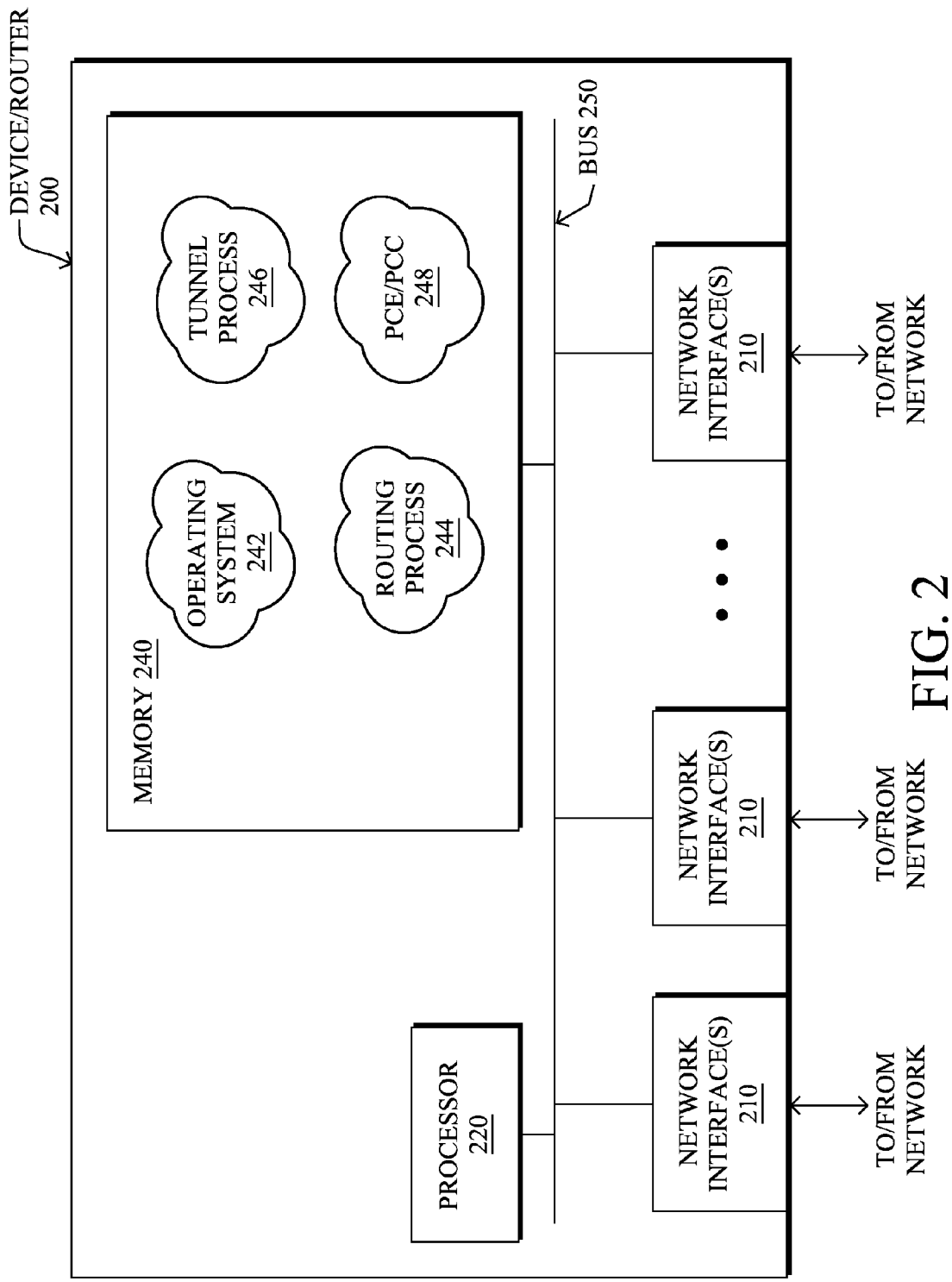
FIG. 2 illustrates an example network device/node.

FIG. 2 is a schematic block diagram of an example node/device (e.g., router) 200 that may be used with one or more embodiments described herein, e.g., as any of the devices in FIGS. 1A and 1B above, particularly as a path computation element or client (PCE or PCC) described herein. The device may comprise one or more network interfaces 210, at least one processor 220, and a memory 240 interconnected by a system bus 250.

The network interface(s) 210 contain the mechanical, electrical, and signaling circuitry for communicating data over links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for virtual private network (VPN) access, known to those skilled in the art.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245, such as routing databases/link state databases (LSDBs)/Traffic Engineering databases (TEDs) and or tables. An operating system 242, portions of which are typically resident in memory 240 and executed by the processor, functionally organizes the device by, among other things, invoking operations in support of software processes and/or services executing on the device. These software processes and/or services may comprise routing process/services 244, tunneling process/services 246, and an illustrative PCE/PCC process 248, as described herein. Note that while the processes are shown in centralized memory 240, alternative embodiments provide for certain aspects of the techniques herein to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as the Interior Gateway Protocol (IGP) (e.g., Open Shortest Path First, "OSPF," and Intermediate-System-to-Intermediate-System, "IS-IS") as IGP services, the Border Gateway Protocol (BGP), etc., as will be understood by those skilled in the art. These functions may be configured to manage routing and forwarding information databases/tables (data structures 245) containing, e.g., data used to make routing and forwarding decisions. Notably, routing services 244 may also perform functions related to virtual routing protocols, such as maintaining virtual routing/forwarding (VRF) instances (illustratively a component of tables 245) as will be understood by those skilled in the art.

Changes in the network topology within the local domain (network 100) may be communicated among nodes/routers 200 within the network 100 using routing services 244, for example, IGP services such as the conventional OSPF and IS-IS link-state protocols. Suppose, for example, that a communication link fails or a cost value associated with a network node changes. Once the change in the network's state is detected by one of the routers, that router may flood an IGP (or BGP) advertisement (message/packet 140) communicating the change to the other routers in the network. In this manner, each of the routers eventually "converges" to an identical view of the network topology.

Multi-Protocol Label Switching (MPLS) is a known protocol in which a path for a source-destination pair may be established along label switched routers (LSRs), and values required for forwarding a packet between adjacent LSRs in the path together with headers or "labels" are prepended to the packet. The labels are used to direct the packet to the correct interface and "next hop" router. The labels precede any IP or other headers allowing use of smaller outer headers for the packet. The path for the source-destination pair, termed a Label Switched Path (LSP), can be established according to various different approaches. One such approach is Label Distribution Protocol (LDP) in which each router in the path sends its label to neighbor routers according to its IP routing table. LDP labels are sent to the neighbor routers in a label mapping message which can include as one of its TLV (Type Length Value) fields a path vector specifying the LSP. For each LSP created, a forwarding equivalent class (FEC) is associated with the path specifying which packets are mapped to the path. A Label Forwarding Information Base (LFIB) (data structure 245) stores the FEC, the next-hop information for the LSP, and the label required by the next hop.

Also, MPLS Traffic Engineering (TE) has been developed to meet data networking requirements such as guaranteed available bandwidth or fast reroute (FRR). MPLS TE exploits modern label switching techniques to build end-to-end tunnels based on a series of constraints through an IP/MPLS network of LSRs. These tunnels are a type of label switched path (LSP) and thus are generally referred to as MPLS TE-LSPs.

Generally, a tunnel is a logical structure that encapsulates a packet (a header and data) of one protocol inside a data field of another protocol packet with a new header. In this manner, the encapsulated data may be transmitted through networks that it would otherwise not be capable of traversing or would otherwise traverse in a less efficient manner. More importantly, a tunnel creates a transparent virtual network link between two network nodes that is generally unaffected by physical network links or devices (i.e., the physical network links or devices merely forward the encapsulated packet based on the new header). While one example of a tunnel is an MPLS TE-LSP, other known tunneling methods include, among others, the Layer Two Tunnel Protocol (L2TP), the Point-to-Point Tunneling Protocol (PPTP), IP tunnels, and generic routing encapsulation (GRE) tunnels.

In particular, establishment of a tunnel (e.g., TE-LSP) requires computation of a path between a head-end node (LSR) to a tail-end node, signaling along the path (e.g., through resource reservation protocol (RSVP)-TE), and modification of forwarding tables at intermediate nodes (LSRs) along the path. Optimally, the computed path is the "shortest" path, as measured in some metric (cost, length, etc.), that satisfies all relevant LSP Traffic Engineering constraints or "attributes," such as e.g., required bandwidth, "affinities" (administrative constraints to avoid or include certain links), priority, class type, etc. In addition, a number of techniques have been developed to allow for dynamic bandwidth adjustment of the signaled bandwidth using RSVP-TE, the allocation of dynamic preemptions so as to mitigate the probability of dead-lock due to bin-packing issues or bandwidth fragmentation, distributed re-optimization techniques to defragment bandwidth in the network, distributed techniques for backup tunnel computation maximizing back-up bandwidth usage according to the assumption of single link/node/SRLG resources (bandwidth sharing between independent resources), etc.

Occasionally, a network element (e.g., a node or link) will fail, causing redirection of the traffic that originally traversed the failed network element to other network elements that bypass the failure. Generally, notice of this failure is relayed to the nodes in the network through an advertisement of the new network topology, e.g., an IGP or BGP Advertisement, and routing tables are updated to avoid the failure accordingly. Reconfiguring a network in response to a network element failure using, e.g., pure IP rerouting, can be time consuming. Many recovery techniques, however, are available to provide fast recovery and/or network configuration in the event of a network element failure, such as Fast Reroute, e.g., MPLS TE Fast Reroute (RFC4090).

Fast Reroute (FRR) has been widely deployed to protect against network element failures, where "backup tunnels" are created to bypass one or more protected network elements (e.g., links, shared risk link groups (SRLGs), and nodes). When the network element fails, traffic is quickly diverted ("Fast Rerouted") over a backup tunnel to bypass the failed element, or more particularly, in the case of MPLS, a set of primary TE-LSPs (tunnels) is quickly diverted. Specifically, the point of local repair (PLR) node configured to reroute the traffic inserts ("pushes") a new label for the backup tunnel, and the traffic is diverted accordingly. Once the failed element is bypassed, the backup tunnel label is removed ("popped") by the last LSR along the backup path, and the traffic is routed along the original path according to the next label (e.g., that of the original TE-LSP). Notably, the backup tunnel, in addition to bypassing the failed element along a protected primary TE-LSP, also intersects the primary TE-LSP, i.e., it begins and ends at nodes along the protected primary TE-LSP.

As noted above, tunnels have been used for a number of applications such as the support of virtual private networks (VPNs) or Traffic Engineering following source routed paths hop-by-hop. Among the number of tunneling techniques developed over the past decade, MPLS TE has been widely deployed by service providers and large enterprise networks in order to optimize the network resource in light of specified traffic demand (traffic engineering) or in support of fast restoration of traffic in case of link and/or node failures thanks to local protection techniques as MPLS TE Fast Reroute that rely on local reroute upon fast detection of a network element failure. MPLS TE-LSPs, for example, were originally computed using distributed constrained shortest path first (CSPF) algorithms where each tunnel head-end was responsible for the computation of the LSP path in the network, using a constrained SPF (e.g., Dijsktra) according to the Traffic Engineering Database (TED) distributed by a link state routing protocol such as OSPF or IS-IS.

A series of challenging problems arose that required the use of a new path computation model known as the Path Computation Element (PCE) model, such as defined in RFC4655. The PCE model generally consists of relying on an external engine (PCE) responsible for the computation of tunnels in the network. Head-ends (or Path Computation Clients—PCCs) send requests to PCEs (PCReq messages) using the PCEP signaling protocol (RFC5440), and receive computed paths thanks to replies (PCRep messages). PCEs have been used mostly for back-up tunnel path computation and inter-domain (Inter-area/AS) path computations where per-domain path computation was the only (potentially very suboptimal) technique available prior to the PCE.

In particular, the PCE is an entity having the capability to compute paths between any nodes of which the PCE is aware in an AS or area (domain). (PCE process/services 248 contain computer executable instructions executed by processor 220 to perform functions related to PCEs in general, and in accordance with one or more embodiments described herein.) PCEs are especially useful in that they are more cognizant of network traffic and path selection within their AS or area, and thus may be used for more optimal path computation. A head-end node/LSR may further operate as a path computation client (PCC) configured to send a path computation request to the PCE, and receive a response with the computed path, which potentially takes into consideration other path computation requests from other PCCs. It is important to note that when one PCE sends a request to another PCE, it acts as a PCC. PCEs conventionally have limited or no visibility outside of their surrounding area(s), level(s), or AS. A PCC can be informed of a PCE either by pre-configuration by an administrator, or by a PCE Discovery (PCED) message ("advertisement") carried within a routing protocol message, which is sent from the PCE within its area or level or across the entire AS to advertise its services.

Generally, PCE functions are hosted on a BR between domains for inter-domain path computation, and there are typically at least two BRs, so there is no single point of failure. For example, ASBRs and ABRs tagged with an asterisk (*) in FIGS. 1A and 1B may be configured as PCEs. Note that while illustratively PCE functions are generally hosted on a BR, the techniques described herein are equally applicable to PCEs not hosted on a BR, accordingly.

Figure 3A:
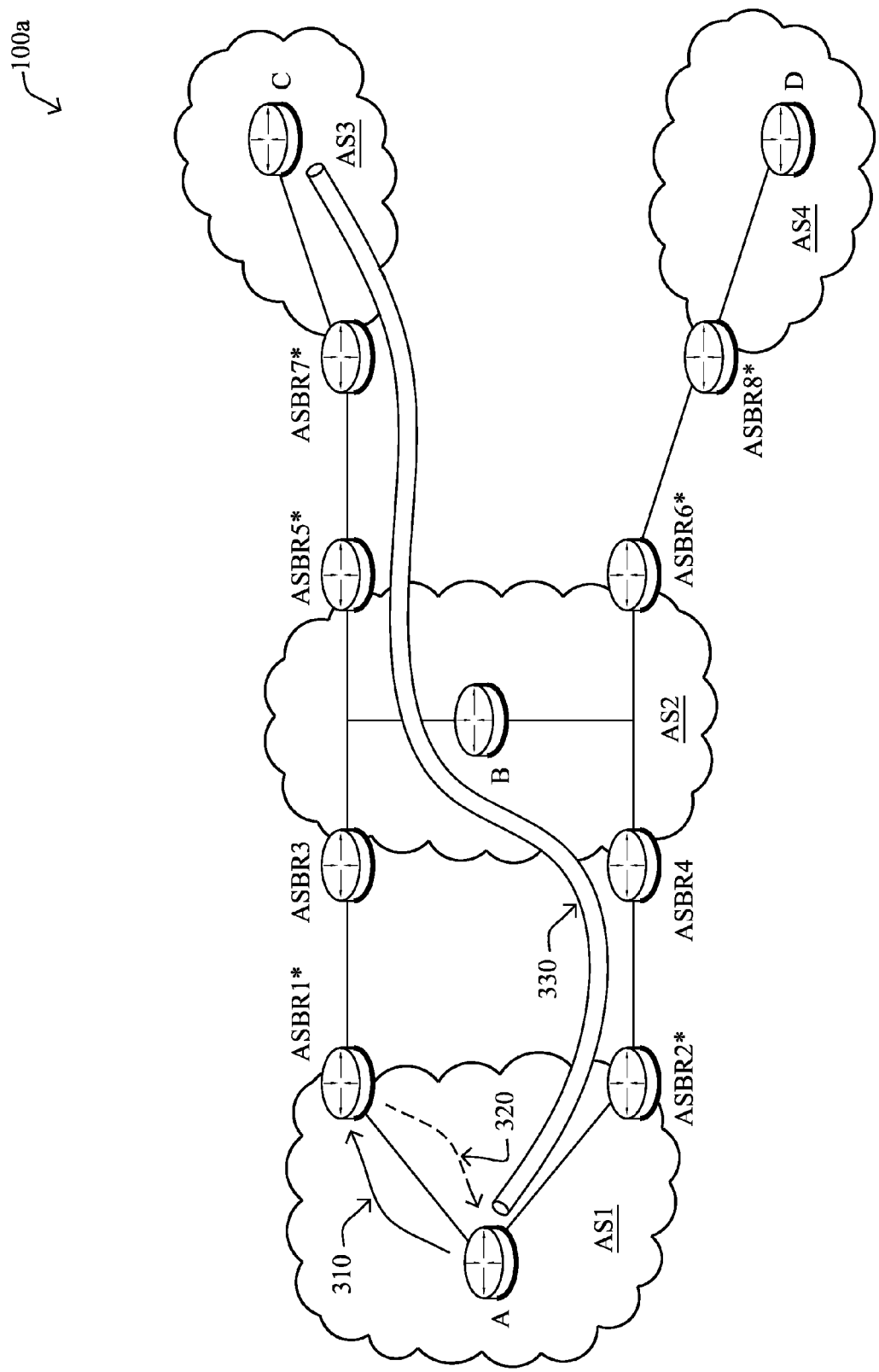
FIGS. 3A-3B illustrate examples of PCE-based tunnel computation in the networks of FIGS. 1A-1B.
Figure 3B:
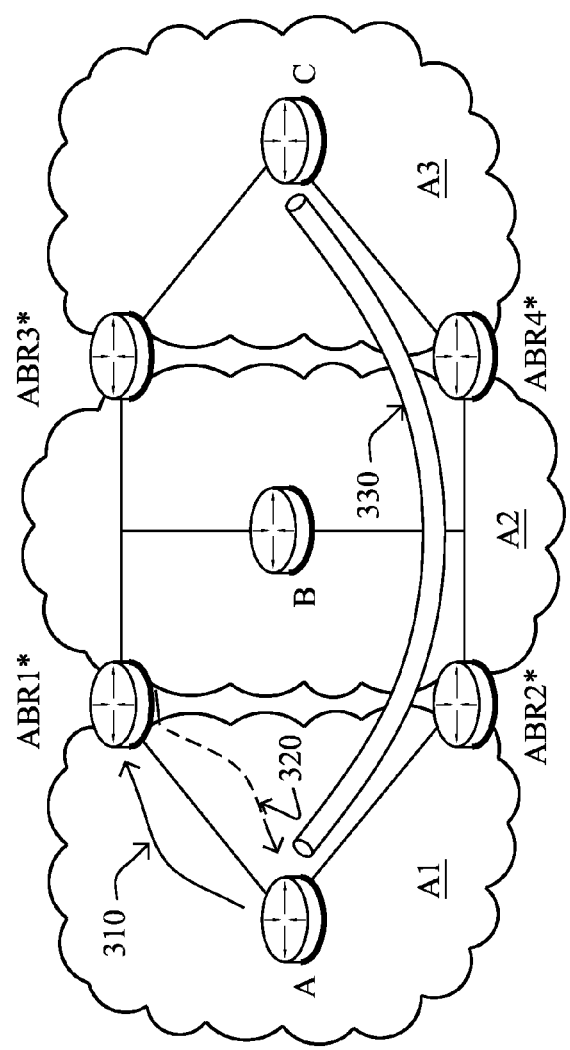

FIGS. 3A-3B illustrate simple examples of PCE-based tunnel computation in the networks 100a and 100b of FIGS. 1A-1B, respectively. In particular, assume in each instance that LSR A, acting as a PCC, requests, from a local PCE (e.g., ASBR1* or ABR1*, respectively), a tunnel to LSR C. The path computation request 310 results in computation of the path, and a path computation response 320 is returned to the head-end LSR A. The tunnel 330 may then be established, accordingly. (Note that for inter-domain computation, the local PCE may act as a PCC to other PCEs in other domains, as mentioned above.) Note further that while PCEs are particularly useful for inter-domain path computation, the techniques herein are not limited to inter-domain path computation, and may, in fact, be used for intra-domain path computation as well.

In PCE-based networks deployed so far, PCEs have been stateless: LSPs were computed by the PCE according to the Traffic Engineering Database (TED) fed in most cases by the routing protocol (ISIS or OSPF, more recently potentially using BGP) without requiring any state maintenance. Although the PCE architecture did refer to the potential use of stateful PCEs as a potentially more optimal model that would keep track of all LSPs states in the network when computing LSPs, the model was seen to be quite complex in terms of signaling, states maintenance, etc. with a number of very challenging issues.

It became apparent that stateful PCE was the solution of choice for several applications such as inter-layer optimizations or global optimization, but only recently did the number of use cases grow significantly considering increased requirements for advanced optimization of bandwidth resources. To that end, stateful PCEs have been implemented, and a stateful PCE draft standard was adopted as the IETF Working Document mentioned above entitled "PCEP Extensions for Stateful PCE", which specifies several new PCEP messages, allowing PCC to update the PCE on their LSP states (PCRpt messages), control LSP delegation (ability for the PCE to remotely control an LSP) and for the PCE to send LSP requests to PCC to learn states (PCUpd messages). As defined in the above document, a function can be initiated either from a PCC towards a PCE (C-E) or from a PCE towards a PCC (E-C). The new functions are:

Capability negotiation (E-C,C-E): Both the PCC and the PCE must announce during PCEP session establishment that they support PCEP Stateful PCE extensions defined in this document;

LSP state synchronization (C-E): After the session between the PCC and a stateful PCE is initialized, the PCE must learn the state of a PCC's LSPs before it can perform path computations or update LSP attributes in a PCC;

LSP Update Request (E-C): A PCE requests modification of attributes on a PCC's LSP;

LSP State Report (C-E): A PCC sends an LSP state report to a PCE whenever the state of an LSP changes; and LSP control delegation (C-E,E-C): A PCC grants to a PCE the right to update LSP attributes on one or more LSPs; the PCE becomes the authoritative source of the LSP's attributes as long as the delegation is in effect; the PCC may withdraw the delegation or the PCE may give up the delegation.

Stateful PCEs are slated to play a major role in future tunnel-enabled network architectures. Though the use of stateful PCEs is intended to solve a wide range of problems, they also bring a number of hard technical issues, including, but not limited to:

1) There are a number of situations where a PCE may receive a burst of signaling requests in the network, which is in contrast with the distributed nature of CSPF: when performing global reoptimizations, rerouting a large number of LSPs upon a link/node failure (in some networks, a single failure may lead to tens of thousands of LSP failures).

2) State maintenance is another critical issue. Stateful PCEs are required to maintain LSP states. When recomputing an LSP, this may first require displacing other LSPs in the network, leading to a very large number of signaling exchanges in the network.

3) Scaling of the overall architecture: attempts have been made to scale the stateful PCE architecture by distributing computation among several PCEs and allowing for inter-PCE communication when performing parallel computations of LSPs. These models have shown very limited scaling due to the number of signaling exchanges between PCEs (similar to IPCs between CPU in massive parallel computing issues).

4) PCE failure during operation of maintenance, which is not an issue when the PCE is stateless. Unfortunately, the issue is significantly more complex when the PCE fails during a maintenance operation (for example, when some LSPs have been updated and the PCE fails before reaching other head-ends and notifying them of an LSP path change that is required for the other LSPs to be routed in the network), thus leaving the network in a very unstable/unknown state.

One fundamental limiting factor of stateful PCE architectures lies in the basic lack of scalability, similarly to any other types of centralized architecture. Most often, this lack of scalability has resulted in abandoning a centralized architecture in favor of less-optimal distributed path computation architectures (e.g., using distributed CSPF on each head-end). Scalability can be determined according to a number of dimensions: ability to handle a large number of path computation requests, ability to compute and serve these requests in real-time (response time), capacity storage of all required states (e.g., network resources reservations, number of TE LSPs), etc.

Distributed Stateful PCE Overlay

The techniques herein to specify an architecture allowing multiple agents (e.g. a PCE in the context of MPLS Traffic Engineering or tunnel path computation) to share the access to one or more databases and manage concurrent access to common resources using a distributed hash table (DHT) ring, thus creating a robust and scalable multi-agent (e.g., multi-PCE) architecture. For instance, the disclosure herein describes steps taken by an agent (e.g., PCE) when joining a DHT overlay and sharing up-to-date TED and state information, and also for computing paths in a collaborative fashion. Notably, the described architecture comprises the following components: 1) a DHT-based overlay network formed by the collaborative agents (e.g., PCEs); 2) partitioning of the ownership of the database (e.g., TED); 3) protocol extensions (e.g., PCEP) allowing agents (e.g., PCEs) to request and lock resources; and 4) adding and removing agents/nodes to/from the overlay.

Specifically, according to one or more embodiments of the disclosure as described in detail below, a particular device in a computer network maintains a locally owned tunnel-state table, and joins a DHT ring. In addition, the locally owned tunnel-state table is shared with other devices of the DHT ring to establish a DHT-owned tunnel-state table. The particular device (and other devices) determines ownership of LSAs for a specific portion of a TED according to the DHT ring. As such, when the particular device (or any device) computes a path for a tunnel using a local TED, the particular device may request permission to use resources along the computed path that were advertised in particular LSAs from owners of those particular LSAs when not owned by the particular device.

Notably, the techniques herein are not tied to a specific use case, though the description below is described specifically in relation to shared access to Traffic Engineering Databases for stateful PCEs. The techniques herein, however, may also be applied to other use cases, such as Traffic Engineering at layer-3 for MPLS-TE tunnel computation and signaling, optical path computation, Software Defined Networks (SDN) (where applications receives guidance from the network at one side and request resources and introduce state into the network at the other side), etc. For instance, the above use cases generally share the same architecture, and may apply specific algorithms in order to manage requirements of the specific use case.

Illustratively, the techniques described herein may be performed by hardware, software, and/or firmware, such as in accordance with the PCE/PCC process 248, which may contain computer executable instructions executed by the processor 220 to perform PCE/PCC functions relating to the techniques described herein (depending upon whether the acting device is a PCE or a PCC), e.g., in conjunction with routing process 244. For example, the techniques herein may be treated as extensions to conventional protocols, such as various PCE/PCC protocols (e.g., stateful PCE/PCC protocols), and as such, may be processed by similar components understood in the art that execute those protocols, accordingly. Notably, in this instance, a non-PCE/PCC device, e.g., an LSR, may also be configured to operate according to an illustrative PCE/PCC process 248, e.g., to perform certain actions in conjunction with a PCE as described herein.

A Distributed Hash Table (DHT), as will be understood by those skilled in the art, is a decentralized, expandable, and fault-tolerant database system which is based on key-value pairs. Some well-known DHT protocols are Chord, Pastry, Kademlia, and P-Grid, which typically define the process for nodes to join an existing DHT network, build the DHT routing table, and use the DHT routing table to forward the PUT/GET messages to the root node of the objects. The Root node is typically defined as the node whose node identifier (ID) is closest to the object being stored (PUT) or retrieved (GET). The basic DHT protocols work very well for simple applications to store and retrieve objects based on a single key in DHT network. It should be noted that the key of the object is obtained by hashing a unique field in the object, and the root node of the object is strictly based on the result of the hash. That is, to place an object into a node, a key of the object is used to determine a particular node in the network (participating in the DHT "ring") that corresponds to that hashed key.

FIG. 4A illustrates an example simplified DHT ring 400, illustrating how each node has its own key space. In particular, to determine a node's key space for which the node is a "root node", an identifier (ID) of the node (e.g., a media access control (MAC) address, a node ID, etc.) is hashed to determine a particular "location" within a DHT (e.g., generally a number within a range of $2^{128}$ or $2^{256}$ numbers). As shown in FIG. 4A, for instance, assuming that a node "X" has a hashed ring value of "5", and node "Y" has a value of "20", then in a ring with locations from 0-29, node X is associated with key space from 5-19, and node Y is associated with key space from 20-29 and 0-4 (hence a "ring" structure). In general, to place an object (e.g., a file, a data structure, etc.) into the network, the object is hashed (e.g., a unique field in the object) to associate it with a particular key (e.g., "12"), and then the associated PUT request is sent to the node corresponding to that key space (e.g., node X). To retrieve the object (GET), the requestor submits that same key (e.g., "12"), and the DHT ring 400 is used to determine which device corresponds to that key space (again, node X). As shown in FIG. 4B, when inserting a new node "Z" into the DHT ring 400, e.g., whose hashed ID corresponds to the value "10", the key space is divided accordingly, such that in the example, node X handles 5-9, node Z handles 10-19, and node Y handles 20-29 and 0-4. (Those skilled in the art will appreciate that there are many ways to organize a keyspace, and the organization shown and described herein is not meant to limit the scope of the embodiments of the disclosure.)

Generally speaking, therefore, DHT rings consist of a hashing algorithm and a signaling protocol used within the overlay. The hashing function allows derivation of an address that represents a location within the DHT overlay (a node). All nodes that are part of the overlay share a common address space and each node owns a portion of the address space so that each single address of the space is owned by one node.

According to the techniques herein, DHT is used between PCEs so to share information about TED and LSP states. In particular, as described herein, the techniques comprise several components:

1) An algorithm used by PCEs to partition the Traffic Engineering Database (TED): the algorithm allows all PCEs to partition the TED in a consistent way and take ownership of one part of it;

2) A set of new DHT messages allowing collaborating PCEs to exchange state information;

3) A set of procedures used to maintain state in the DHT overlay; and

4) A set of procedures used to operate the DHT overlay.

The following description relates generally to the context of stateful PCEs sharing a common TED and database of established tunnels (e.g., Traffic Engineering LSPs), however, the embodiments are not so limited. In the context of PCEs, each PCE maintains its Traffic Engineering Database (TED) (as per PCE procedures) and an LSP State Table (as per stateful PCE procedures). The LSP State Table is shared within the DHT overlay so each PCE has two copies of the LSP State Table: one local and one available from the DHT overlay.

A new algorithm is described herein in order to partition the TED table and assign ownership of each TED LSA to a given PCE. In particular, each PCE is configured in order to join a common DHT overlay using standard DHT procedures. In general, the PCE DHT overlay consists of PCEs sharing their LSP state table and taking ownership of partitions/portions of the TED database. To partition the TED, the techniques herein illustratively perform a DHT hashing algorithm on LSA-IDs. That is, each PCE applies the DHT hashing function to the entire set of LSAs in the TED, such that each LSA-ID is associated with an address (part of the DHT overlay address space). These addresses are then mapped to ownership by a particular node within the DHT overlay (e.g., one of the PCEs actively joined to the DHT ring 400).

As shown in FIG. 5, for example, a TED 500 illustrates a plurality of LSAs 1-N (field 510), and corresponding owner devices 520. The PCE-Owner is the PCE which owns the DHT address (determined by the DHT hashing function) and therefore it also owns the LSA and the node/links it represents. Once the hash function is completed, all PCEs will have hashed the entire TED and each LSA (i.e., node/link) will be owned by one of the collaborating PCEs of the DHT ring. Note that the TED database is not shared in the DHT overlay; rather, the DHT hashing function is used solely for the purpose of determining the PCE-owner of each LSA for use as described herein. In particular, each PCE, by walking its local TED (e.g., derived from OSPF/ISIS), will find, for each LSA, the PCE-Owner of the LSA. Each PCE will therefore understand, during path computation (described below), which PCE owns each LSA corresponding to nodes/links of the computed path. The PCE-Owner (a PCE that owns a given LSA) concept is key to allowing concurrent computations to be shared among several PCEs, while still ensuring that computation is accurate and performed in a consistent manner between multiple PCEs.

A PCE client (PCC) may request path computations to the PCE, such as a tunnel head-end router requesting a path for an MPLS-TE LSP, an application element within the context/architecture of Software Defined Networks (SDN) requesting a set of network resources and paths in the network, etc. According to the techniques herein, when requested by the PCC, the PCE computes a path using its local copy of the TED, and some path computation algorithm (e.g., constrained SPF with global optimization). During computation, the PCE inspects the LSAs corresponding to the nodes/links the computed path traverses.

Based on the DHT operation described above, the computing PCE will know what are the PCE-Owners of each LSA describing nodes/link traversed by the path that is being computed. To avoid contention of resource reservation, the techniques herein request the resources from the PCE-Owner of the LSA (according to TED partition rules). That is, when computation results in an LSA that is not owned by the computing PCE, then the computing PCE will find in the DHT overlay the PCE-Owner of such LSA. The computing PCE then asks the PCE-Owner permission to use the resources described in the LSA. In this manner, the PCE-Owner is responsible for the resources of a given node/link in the network and ensures that no contention happens when multiple PCEs are computing paths at the same time (competing for the same set of resources).

Figure 6A:
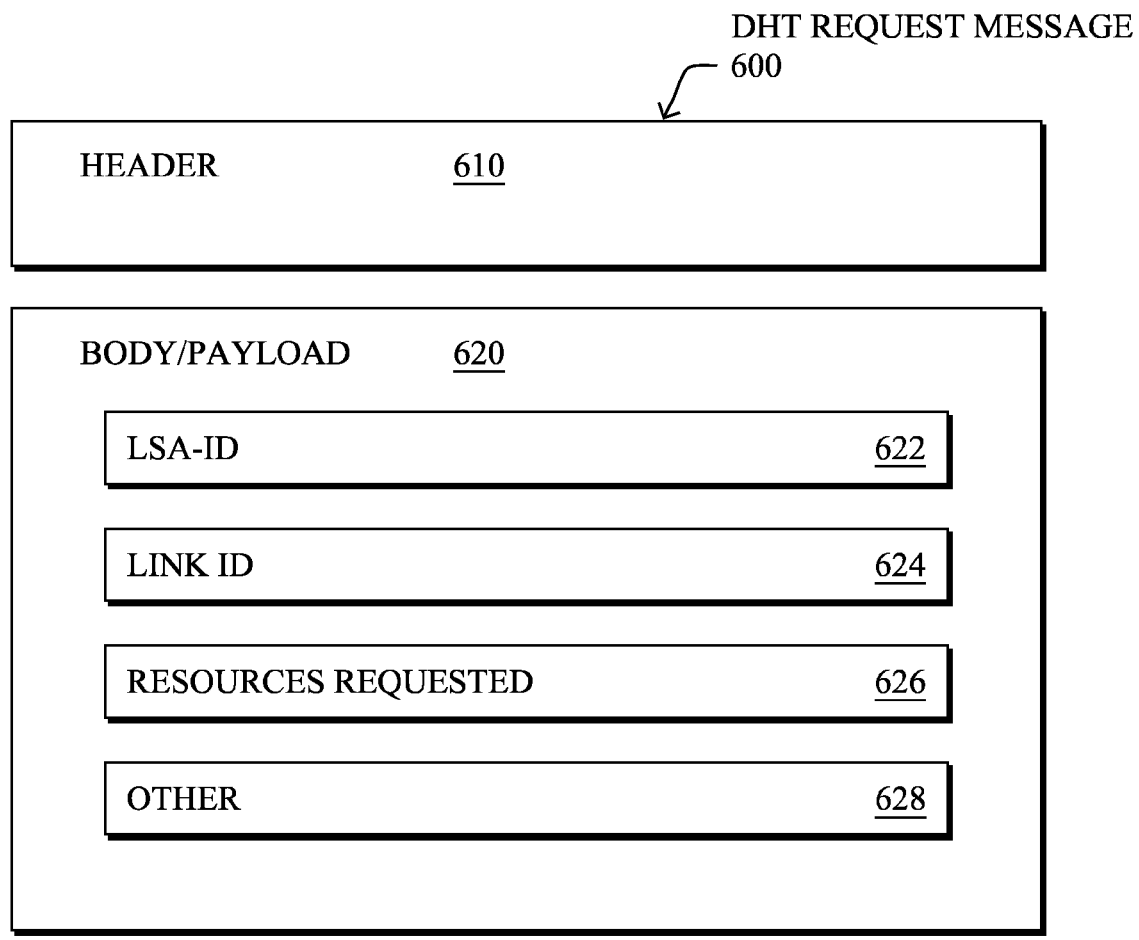
FIGS. 6A-6B illustrate examples of DHT messages.
Figure 6B:
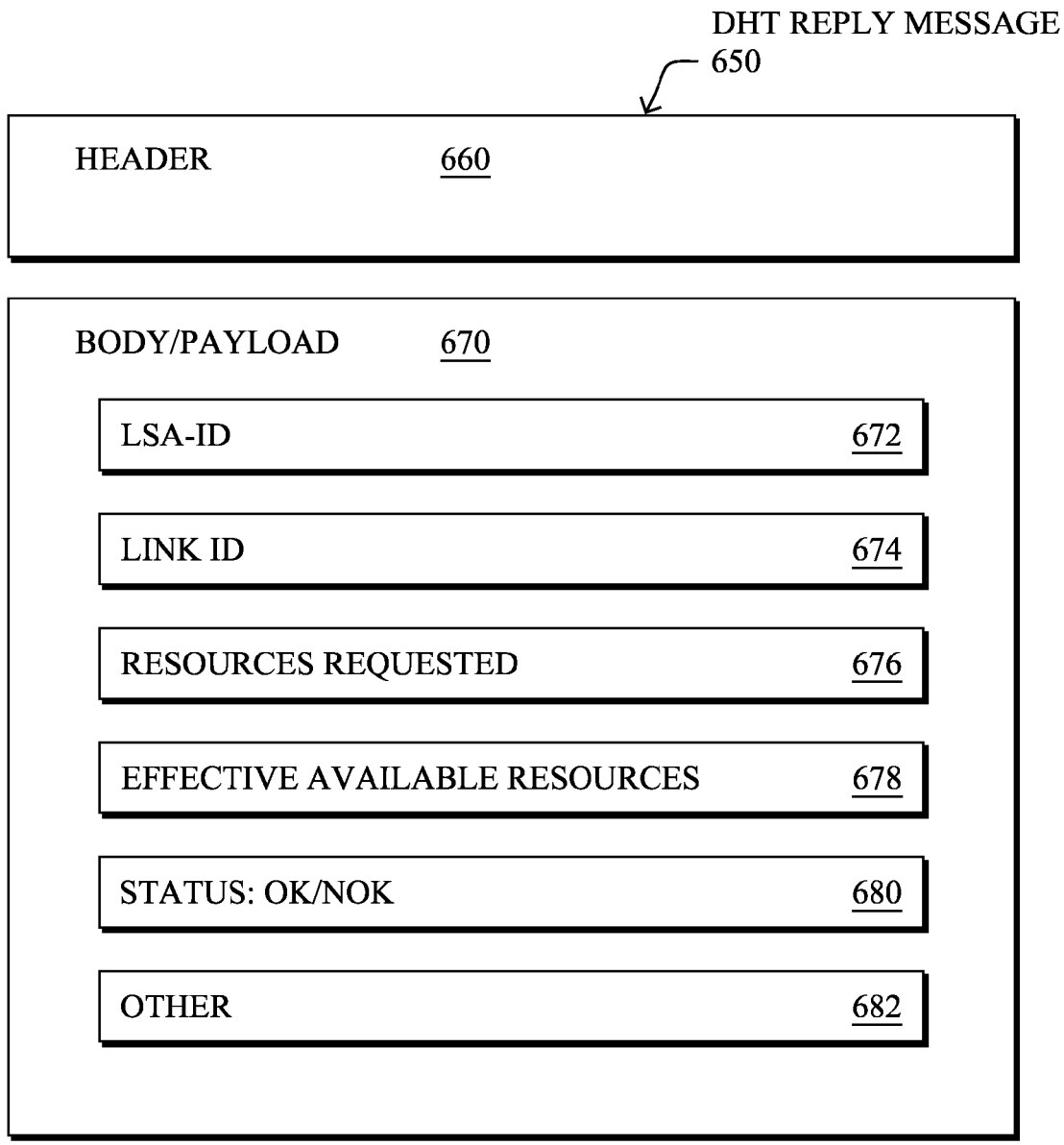

Illustratively, the request for resources may be performed using DHT messages sent between the computing PCE and the PCE-Owner as described with reference to FIGS. 6A-6B. In particular, as shown in FIG. 6A, a request message 600 may comprise a header 610 (for use with forwarding the message through the network), and a payload 620 comprising various fields. According to the example format of a request message, such fields may comprise an LSA-ID 622, a Link ID 624, a field for resources requested 626, and other data 628. The PCE-Owner checks the availability of the resources based on its local knowledge of the TED, and replies through a reply message 650 containing a header 660 and payload 670 consisting of an LSA-ID 672 (as found in the original request), a Link ID 674 (as found in the original request), the resources requested 676 (as found in the original request), a field for effective available resources 678, a status field 680 (e.g., "ok"/granted or "nok"/prevented), as well as any other suitable fields 682.

In particular, if resources are available, the PCE-Owner flags these resources as being pre-allocated and maintains this state for a given (controlled) time. The resources are thus temporarily locked for a configurable period of time for that specific request, and will be unlocked once the LSP is reported as signaled (accomplished). The reporting may be performed by the computing PCE to the PCE-Owner. Alternatively, the PCC could report to the PCE-Owner directly the state of the LSP and hence confirm resources utilization. (Note that this may require an extension to the PCEP protocol for the replying PCE to provide the address of the PCE-Owner to the requesting PCC).

If resources are not available, however, the PCE-Owner replies with the same message including the failed status of the resource request and the effective available resources 678. For example, if the reservation was for 10 MB and the available bandwidth is 8 MB, the PCE-Owner may reply with the 8 MB value so as to instruct the computing PCE of the effective resource availability. This information could be used by the requesting PCE as a fall-back option to compute a "closest match" LSP or other purpose (e.g., configuring refresh timers based on a level of accuracy).

The computing PCE repeats the same process for all nodes/links traverses in the path as computed and each involved PCE-Owner will do the same resource validation process. Once the computing PCE has finished the computation, it should have received from all PCE-Owners all confirmations of the resources availability. The computing PCE provides the computed path to its client (PCC, e.g., tunnel head end or application element), and the PCC signals the path (e.g., through RSVP) and may report the state to the PCE. For example, once the path is signaled by the PCC and its state reported to the computing PCE, the computing PCE may then confirm the resource utilization to each PCE-Owner of the LSAs so that the resources is now locked/assigned for that LSP. In the mean time, the routers in the network update their LSAs (e.g., OSPF/ISIS) according to their conventional threshold configuration/settings.

According to one or more embodiments herein, once the LSP is signaled by the PCC, it is also reported to the PCE, such that the PCE may then insert the LSP state into the LSP State Table. That is, the LSP State Table consists of a table in the DHT overlay composed by all individual states of all known LSPs in the network, and is populated by all collaborating PCEs. Each PCE, therefore, has the ability to walk through the global LSP state table so to retrieve state of all LSPs. Note that as mentioned above, each PCE also maintain a local copy of the global LSP state table (used by the computation algorithm to serve new requests).

If a PCE fails or disappears from the DHT ring, all states originally inserted by the failed PCE are preserved in the local copies each other PCE has stored. When a PCE fails, the new owner of the address space left by the failed PCE will re-insert the states into the DHT global state table. It is worth noting that in case of failure of a PCE while resources are temporarily locked, improper states reservations may exist in the TED; this is not an issue since the LSP set up may fail, leading to an IGP update, used to update the TED. In other words, when a PCE fails, DHT procedures will update the ring and the remaining PCEs will reform the DHT overlay and reparation their address space. This has also an effect on the partition of the TED: each PCE will re-partition the entire TED and each PCE-Owner will understand which sets of LSAs it owns. Once the DHT overlay is updated, the global state table may be updated by the remaining PCEs according to their new address space and the local LSP state table copy.

When a new PCE is inserted into the DHT overlay, the new PCE inserts itself into the DHT overlay according to DHT procedures and acquires a portion of the DHT overlay address space. Each PCE re-partitions the TED and each PCE-Owner will understand what are the set of LSAs it owns. The new PCE thus acquires ownership of its part of the TED, and acquires local copy of LSP State-Table.

Notably, in accordance with one or more specific embodiments herein, the techniques may also determine the appropriate number of active stateful PCEs to have in the DHT ring at any given time by observing the load of active stateful PCEs and dynamically adjusting the number of them by allowing overloaded PCEs to request candidate PCEs to join the DSPO using information about Boot Strapping node in charge of managing the DHT ring learned thanks to IGP extension. The techniques herein also allow for the dynamic removal of active stateful PCE should its load cross a low threshold so as to keep the number of active PCEs as minimum as possible.

To increase the scalability of the distributed stateful PCE overlay (DSPO) described above, mechanisms are described herein that allow a PCE to dynamically join or leave the DSPO according to the dynamic PCE loads. In particular, each PCE may report to the DSPO (thanks to new DHT messages) its current load so that each collaborating PCE in the DSPO have visibility of the load of each other PCE. Load updates may be provided on a regular basis using a mesh of peering connectivity between active PCEs.

In general, as described herein, DSPO service information may be advertised among the nodes joining a DHT overlay, such as the bootstrap node address (the bootstrap node is used by nodes when joining a DHT overlay), etc. Upon detection of a high computational load on a PCE, the techniques herein provide for notification from a PCE of a congested state requesting other candidate stateful PCEs to join the set of serving (active) PCEs (and thus the DSPO used by all stateful PCE). Lastly, the techniques herein described a mechanism to signal the bootstrapping node in charge of a specific DSPO.

In its initial state, the (DHT) DSPO bootstrap node advertises DSPO info, such as in a new "GenApp" Sub-TLV for IS-IS (e.g., as specified in the IETF Internet Draft entitled "Advertising Generic Information in IS-IS"<draft-ietf-isis-genapp> by Ginsberg, et al.). The GenApp TLV (or sub-TLV) may let candidate-PCEs know from where to request a DHT address for entering into the DSPO. Also, PCE nodes may be initially (e.g., statically) configured as candidate-PCEs. Each candidate-PCE advertises its PCE capabilities into the Capability TLV in the IGPs (OSPF/ISIS).

For addition of a Candidate-PCE into an established DSPO (that is, to make a Candidate-PCE an Active-PCE), an illustrative algorithm determines when one of the defined conditions is met, such as a load of an Active-PCE exceeding a given high-end configurable threshold, one of the Active PCEs (dynamically elected, such as the PCE with higher ID) may decide to request additional Active-PCE, taken from a list of Candidate-PCEs. The elected Candidate-PCE joins the DSPO by inspecting DSPO information previously received, e.g., through the GenApp TLV in the IGP (OSPF/ISIS). At this stage, the Candidate-PCE advertises itself in the IGP (Capability TLV) as an Active-PCE.

Conversely, for removal of an Active-PCE, each Active-PCE knows the load of each other Active-PCEs. Upon certain conditions (e.g., low CPU usage, low number of computations and states) an Active-PCE may dynamically decides to leave the DSPO and to move its state to Candidate-PCE (e.g., the PCE with the lowest load). The (self) elected Active-PCE leaves the DSPO and the DSPO updates itself according to overlay maintenance procedures described in DSPO architecture above.

Figure 7:
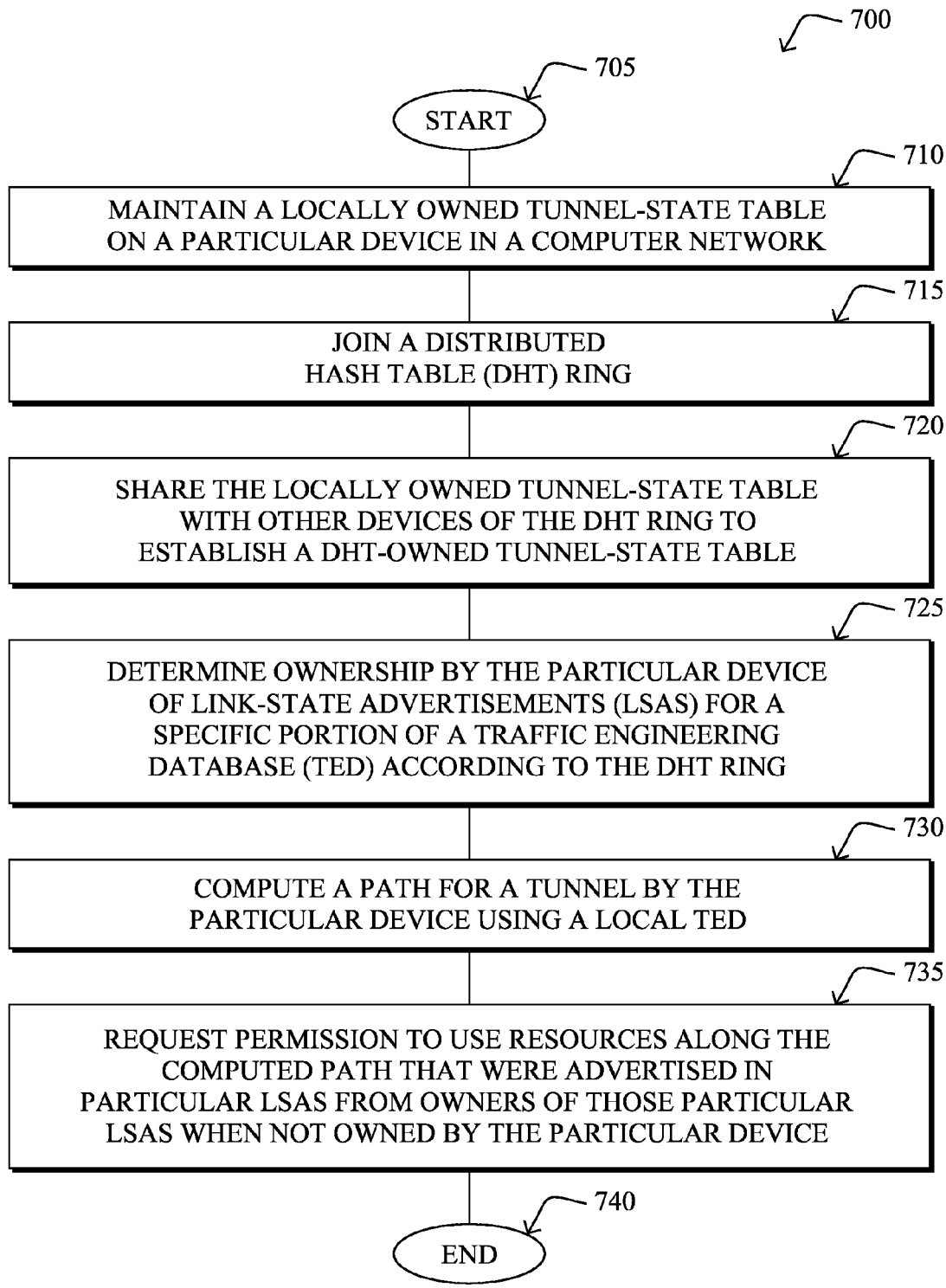
FIG. 7 illustrates an example simplified procedure for establishing a distributed agent overlay architecture.

FIG. 7 illustrates an example simplified procedure 700 for establishing a distributed agent overlay architecture in accordance with one or more embodiments described herein. The procedure 700 may start at step 705, and continues to step 710, where, as described in greater detail above, a particular device, such as a PCE, maintains a locally owned tunnel-state table, and also joins a DHT ring in step 715. Once in the ring, in step 720 the device shares the locally owned tunnel-state table with other devices of the DHT ring, and a DHT-owned tunnel-state table is established within the ring. Note that each PCE may create a local copy of the DHT learned tunnel-state table, thus allowing a PCE to keep knowledge of the current state in the network even in case of failure of the DHT ring or one of the PCEs connected to it. In step 725, the particular device (and each device) determines ownership of LSAs for a specific portion of a TED 500 according to the DHT ring, as detailed above. For instance, the devices may perform a DHT hash on an identifier of each LSA to map the LSA to each device of the DHT ring.

In accordance with the techniques herein, in step 730 the device may compute a path for a tunnel using a local TED, such as in response to a PCC request or other causes. Based on determining ownership of LSAs upon which a computed path is based, in step 735 the computing device may request permission to use resources along the computed path that were advertised in particular LSAs from other owners of those particular LSAs (i.e., when not owned by the particular device). The procedure 700 ends in step 740, notably with the option to update tables, perform further path computation, etc.

Figure 8:
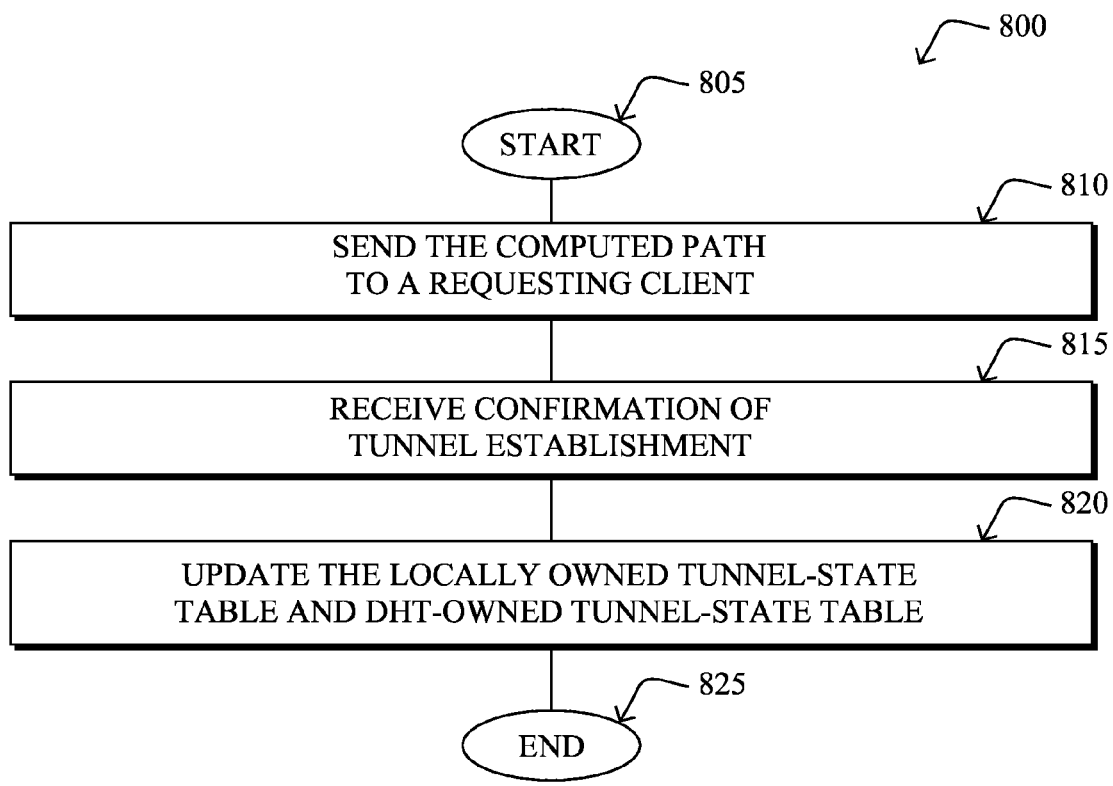
FIG. 8 illustrates an example simplified procedure for establishing a distributed agent overlay architecture, particularly from the perspective of PCE-PCC communication.

Moreover, FIG. 8 illustrates an example simplified procedure 800 for establishing a distributed agent overlay architecture in accordance with one or more embodiments described herein, particularly from the perspective of PCE-PCC communication. The procedure 800 may start at step 805 (e.g., once procedure 700 above has completed), and continues to step 810, where, as described in greater detail above, the particular device (e.g., PCE) sends the computed path to a requesting client. Upon receiving a confirmation of tunnel establishment in step 815, the device updates its locally owned tunnel-state table and DHT-owned tunnel-state table in step 820. The procedure 800 may then end in step 825.

Figure 9:
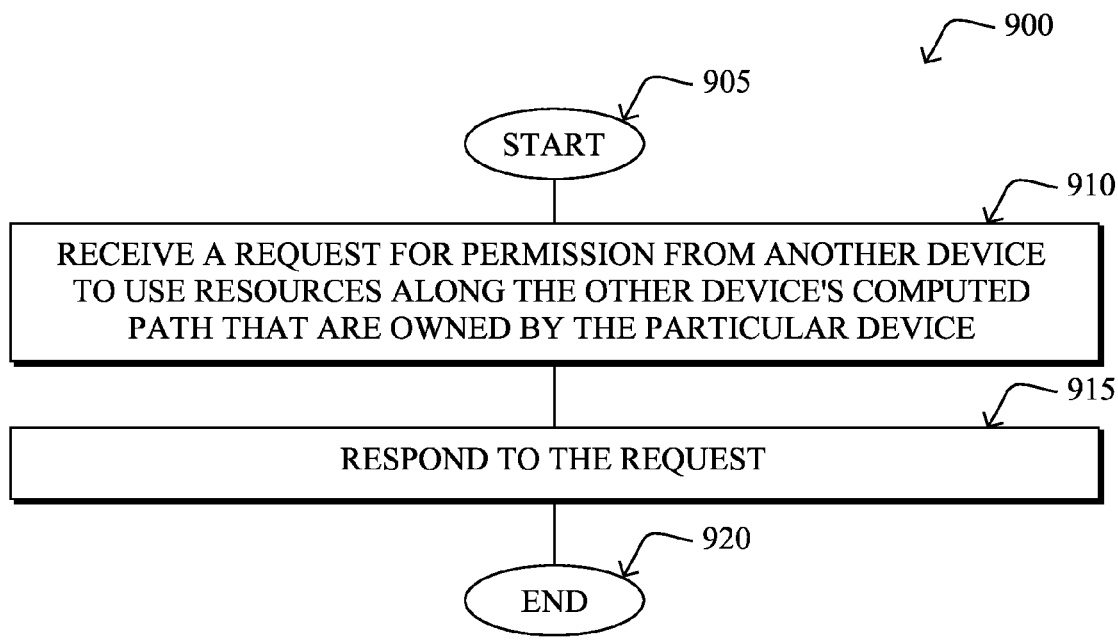
FIG. 9 illustrates another example simplified procedure for establishing a distributed agent overlay architecture, particularly from the perspective of an owner device.

In addition, FIG. 9 illustrates another example simplified procedure 900 for establishing a distributed agent overlay architecture in accordance with one or more embodiments described herein, particularly from the perspective of an owner device. The procedure 900 may start at step 905, and continues to step 910, where, as described in greater detail above, the owner device receives a request for permission from another device to use resources along the other device's computed path that are owned by the particular owner device. As described in detail above, the owner device may respond to the request in step 915, such as with a reply message 650 indicating "ok" or "nok". The illustrative procedure 900 may then end in step 920 until another request for permission.

Figure 10:
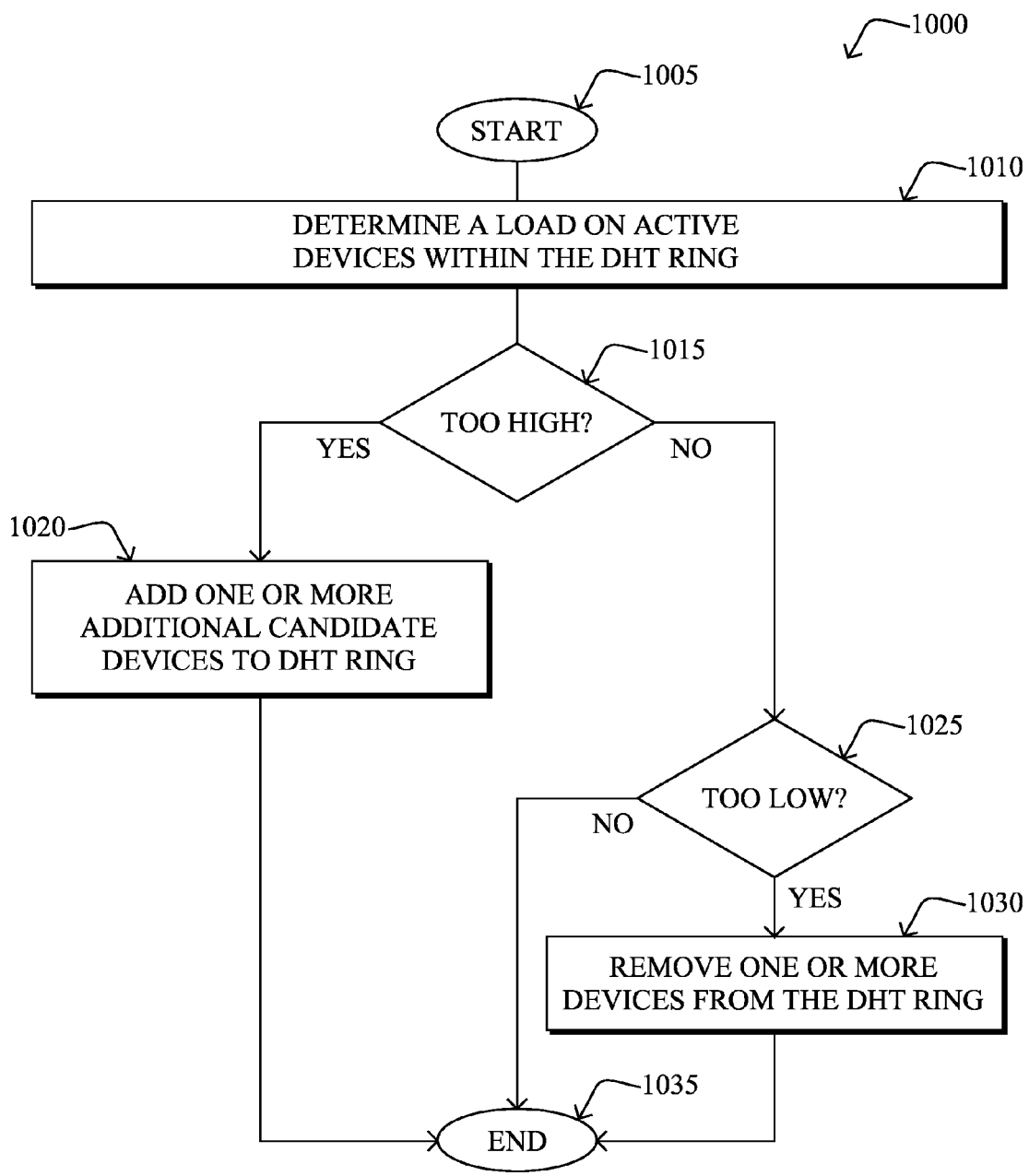
FIG. 10 illustrates still another example simplified procedure for establishing a distributed agent overlay architecture, particularly for adding and removing agent devices from the DHT rings.

Lastly, FIG. 10 illustrates still another example simplified procedure 1000 for establishing a distributed agent overlay architecture in accordance with one or more embodiments described herein, particularly for adding and removing agent devices from the DHT rings. The procedure 1000 may start at step 1005, and continues to step 1010, where, as described in greater detail above, a management device (e.g., a bootstrap node, network management server, etc.) determines a load on active devices within the DHT ring, and if "too high" (greater than a first threshold) in step 1015, may add one or more additional candidate devices to the DHT ring in step 1020. On the other hand, if in step 1025 the load is "too low" (less than a second threshold), then in step 1030 one or more devices may be removed from the DHT ring, as described above. The procedure 1000 illustratively ends in step 1035, though notably with the option to add or remove devices (agents) dynamically over time based on the observed network conditions.

It should be noted that while certain steps within procedures 700-1000 may be optional as described above, the steps shown in FIGS. 7-10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 700-1000 are described separately, certain steps from each procedure may be incorporated into each other procedure, and the procedures are not meant to be mutually exclusive.

The techniques described herein, therefore, provide for a distributed agent overlay architecture, particularly a distributed stateful PCE overlay (DSPO) architecture. In particular, the techniques herein specify an architecture allowing multiple agents (e.g. PCEs) to share the access to databases and manage concurrent access to common resources using a DHT ring, thus creating a robust and scalable multi-agent (e.g., multi-PCE) architecture. In addition, the techniques herein allow the distributed stateful PCE architecture to scale within a routing domain by allowing load sharing of path computations across multiple PCEs, while still ensuring consistent and accurate tunnel state information. Moreover, the techniques dynamically determine the optimum number of active agents (e.g., PCEs) at any time, thus optimizing the overall architecture, and determining the optimum number of agents so as to avoid congestion on the agents, while minimizing the number of active agents to reduce the overall overhead.

While there have been shown and described illustrative embodiments that provide enhanced operation for stateful PCE architectures, it is to be understood that various other adaptations and modifications may be made within the spirit and scope of the embodiments herein. For example, the embodiments have been shown and described herein with relation to MPLS TE-LSPs and other various protocols. However, the embodiments in their broader sense are not as limited, and may, in fact, be used with any function for which a PCE may be responsible, such as other types of tunnels, other types of path computation, etc. In addition, as noted above, the architecture described herein need not be limited to stateful PCE, but may be applied to other types of technology, such as L3 Traffic Engineering for MPLS-TE tunnels (tunnel computers), Optical Layer technology (optical path computers), SDN architecture/devices, etc.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
maintaining a locally owned tunnel-state table on a particular device in a computer network;
joining a distributed hash table (DHT) ring;
sharing the locally owned tunnel-state table with other devices of the DHT ring to establish a DHT-owned tunnel-state table;
determining ownership by the particular device of link-state advertisements (LSAs) for a specific portion of a traffic engineering database (TED) according to the DHT ring;
computing a path for a tunnel by the particular device using a local TED; and
requesting permission to use resources along the computed path that were advertised in particular LSAs from owners of those particular LSAs when not owned by the particular device.

2. The method as in claim 1, further comprising:
sending the computed path to a requesting client.

3. The method as in claim 1, further comprising:
receiving confirmation of tunnel establishment; and
updating the locally owned tunnel-state table and DHT-owned tunnel-state table.

4. The method as in claim 1, further comprising:
receiving a request for permission from another device to use resources along another computed path that are owned by the particular device; and
responding to the request.

5. The method as in claim 1, wherein determining ownership comprises:
performing a DHT hash on an identifier of each LSA to map the LSA to each device of the DHT ring.

6. The method as in claim 1, further comprising:
determining a load on active devices within the DHT ring;
in response to the load being greater than a first threshold, add one or more additional candidate devices to DHT ring.

7. The method as in claim 6, further comprising:
in response to the load being lower than a second threshold, removing one or more devices from the DHT ring.

8. The method as in claim 1, wherein the devices of the DHT ring are selected from a group consisting of: path computation elements (PCEs), tunnel computers, optical path computers, and software defined network (SDN) devices.

9. An apparatus, comprising:
one or more network interfaces to communicate as a particular device within a computer network;

a processor coupled to the network interfaces and adapted to execute one or more processes; and a memory configured to store a process executable by the processor, the process when executed operable to:
maintain a locally owned tunnel-state table;
join a distributed hash table (DHT) ring;
share the locally owned tunnel-state table with other devices of the DHT ring to establish a DHT-owned tunnel-state table;
determine ownership by the particular device of link-state advertisements (LSAs) for a specific portion of a traffic engineering database (TED) according to the DHT ring;
compute a path for a tunnel using a local TED; and
request permission to use resources along the computed path that were advertised in particular LSAs from owners of those particular LSAs when not owned by the particular device.

10. The apparatus as in claim 9, wherein the process when executed is further operable to:
send the computed path to a requesting client.

11. The apparatus as in claim 9, wherein the process when executed is further operable to:
receive confirmation of tunnel establishment; and
update the locally owned tunnel-state table and DHT-owned tunnel-state table.

12. The apparatus as in claim 9, wherein the process when executed is further operable to:
receive a request for permission from another device to use resources along another computed path that are owned by the particular device; and
respond to the request.

13. The apparatus as in claim 9, wherein the process when executed to determine ownership is further operable to:
perform a DHT hash on an identifier of each LSA to map the LSA to each device of the DHT ring.

14. The apparatus as in claim 9, wherein the apparatus is selected from a group consisting of: a path computation element (PCE), a tunnel computer, an optical path computer, and software defined network (SDN) device.

15. A tangible, non-transitory, computer-readable media having software encoded thereon, the software, when executed by a processor on a particular device, operable to:
maintain a locally owned tunnel-state table;
join a distributed hash table (DHT) ring;
share the locally owned tunnel-state table with other devices of the DHT ring to establish a DHT-owned tunnel-state table;
determine ownership by the particular device of link-state advertisements (LSAs) for a specific portion of a traffic engineering database (TED) according to the DHT ring;
compute a path for a tunnel using a local TED; and
request permission to use resources along the computed path that were advertised in particular LSAs from owners of those particular LSAs when not owned by the particular device.

16. The computer-readable media as in claim 15, wherein the software when executed is further operable to:
send the computed path to a requesting client.

17. The computer-readable media as in claim 15, wherein the software when executed is further operable to:
receive confirmation of tunnel establishment; and
update the locally owned tunnel-state table and DHT-owned tunnel-state table.

18. The computer-readable media as in claim 15, wherein the software when executed is further operable to:
receive a request for permission from another device to use resources along another computed path that are owned by the particular device; and
respond to the request.

19. The computer-readable media as in claim 15, wherein the software when executed to determine ownership is further operable to:
perform a DHT hash on an identifier of each LSA to map the LSA to each device of the DHT ring.

20. The computer-readable media as in claim 15, wherein the particular device is selected from a group consisting of: a path computation element (PCE), a tunnel computer, an optical path computer, and software defined network (SDN) device.

* * * * *